United States Patent [19]

Cannon et al.

[11] 4,292,289

[45] Sep. 29, 1981

[54] PROCESS FOR PRODUCING HYDROGEN FLUORIDE AND PHOSPHORIC ACID

[75] Inventors: Curtis W. Cannon, San Diego, Calif.; Robert N. Hall, Boulder, Colo.

[73] Assignee: Climax Chemical Company, Hobbs, N. Mex.

[21] Appl. No.: 121,486

[22] Filed: Feb. 14, 1980

Related U.S. Application Data

[63] Continuation-in-part of Ser. No. 987, Jan. 4, 1979, Pat. No. 4,202,867, which is a continuation-in-part of Ser. No. 939,958, Sep. 6, 1978, abandoned, which is a continuation-in-part of Ser. No. 828,925, Aug. 29, 1977, abandoned.

[51] Int. Cl.$^3$ .................... C01B 25/10; C01B 25/16
[52] U.S. Cl. .................... 423/301; 423/319; 423/483; 423/485; 423/467
[58] Field of Search ............... 423/301, 483, 484, 316, 423/317, 319, 320, 485, 467

[56] References Cited

U.S. PATENT DOCUMENTS

| | | | |
|---|---|---|---|
| 3,428,422 | 2/1969 | Wiesboeck | 423/301 |
| 3,429,659 | 2/1969 | Wiesboeck | 423/301 |
| 3,584,499 | 6/1971 | Wiesboeck | 423/301 |
| 3,634,034 | 1/1972 | Nickerson et al. | 423/301 |

*Primary Examiner*—O. R. Vertiz
*Assistant Examiner*—Gregory A. Heller
*Attorney, Agent, or Firm*—Vinson & Elkins

[57] ABSTRACT

An improved method for producing hydrogen fluoride from fluoride bearing ores, such as fluorospar and fluorapatite, by reaction of the ore as a slurry in fluorosulfonic acid. The slurry is heated by the exothermic heat of the reaction to vaporize volatile phosphorous compounds and substantial quantities of hydrogen fluoride. The calcium fluoride is substantially reacted to form hydrogen fluoride. High silica fluorospar ores can be used since silicon tetrafluoride is not formed with fluorosulfonic acid. Another feature provides for addition of calcium fluoride to the slurry to react with the by-product sulfuric acid in the residual solids to eliminate the sulfuric acid recovery step in the process. Hydrogen fluoride produced is recovered, together with the hydrogen fluoride produced from the hydrolysis or pyrolysis of the intermediate fluorophosphorous compounds. Additionally, at least a portion of the hydrogen fluoride can be reacted with sulfur trioxide to form fluorosulfonic acid for makeup in the process.

16 Claims, No Drawings

PROCESS FOR PRODUCING HYDROGEN FLUORIDE AND PHOSPHORIC ACID

This application is a continuation-in-part of Ser. No. 000,987, filed Jan. 4, 1979, now U.S. Pat. No. 4,202,867, which is a continuation-in-part of Ser. No. 939,958, filed Sept. 6, 1978, now abandoned, which was a continuation-in-part of Ser. No. 828,925, filed Aug. 29, 1977 now abandoned.

BACKGROUND OF THE INVENTION

1. Field of the Invention

This invention relates to production of hydrogen fluoride. More particularly, the invention relates to a process for producing hydrogen fluoride in a process for manufacturing volatile phosphorous compounds and their subsequent conversion to phosphoric acid.

2. Prior Art

In our patent applications there is taught a novel method for treating calcium phosphate sources such as bone phosphate and phosphate rock with fluorosulfonic acid, in the presence of a limited amount of water, to convert over 98 percent of the phosphorous to volatile compounds that can be subsequently hydrolyzed. This method is taught particularly in copending application Ser. No. 000,987, filed Jan. 4, 1979, now U.S. Pat. No. 4,202,867.

The method includes the hydrolysis of the volatile compounds to phosphoric acid and hydrogen fluoride. Hydrogen fluoride is then recycled to react with the required sulfur trioxide to make the requirement of fluorosulfonic acid for the process.

It was taught therein that dependent on the form of silica impurities in the ore, a net production of hydrogen fluoride could be obtained from the fluoride content of the rock. The process would be relatively self-sustaining as far as hydrogen fluoride used for making fluorosulfonic acid requirements would be concerned. Sulfur trioxide is essentially the net reagent required to treat the ore to produce the volatile phosphorous intermediates for subsequent conversion to phosphoric acid and hydrogen fluoride.

It had been thought that silicon dioxide would not be appreciably attacked by the fluorosulfonic acid so that a portion of the fluoride content of the ore could be released as hydrogen fluoride. It was recognized that the recycle of hydrogen fluoride to the process and the utilization of hydrogen fluoride produced from the fluoroapatite ore, to make up process losses, would be very pertinent to the economics of phosphoric acid manufacture.

Currently, essentially all hydrogen fluoride is manufactured by the treatment of fluorospar ore (calcium fluoride, CaF$_2$) with sulfuric acid at about 250° to 300° C. It is felt that operating conditions must be carefully controlled to minimize the formation of an undesirable by-product, fluorosulfonic acid. Using the current methods, acid grade fluorospar must be low in silica, and is usually specified to contain no less than 97% CaF$_2$. When silica, which is usually present in fluorospar and fluorapatite, reacts sulfuric acid is consumed and hydrogen fluoride production is lost. The following reaction illustrates this result:

$$2CaF_2 + SiO_2 + H_2SO_4 \rightarrow 2CaSO_4 + SiF_4 + 2H_2O \quad (1)$$

Theoretically, for each pound of silica present in the ore, 2.6 pounds of fluorospar is wasted and 3.3 pounds of sulfuric acid is consumed. SiF$_4$ reacts with water, usually present, to form fluorosilicic acid, an objectionable by-product.

OBJECTS OF THE INVENTION

It is an object of the invention to produce hydroge fluoride, in significant quantities, in conjunction with volatile phosphorous compounds, from fluoride bearing ores.

Another object of the invention is to produce hydrogen fluoride as a co-product with phosphoric acid.

Yet another object of the invention is to provide a source of hydroge fluoride for recycle, to react with sulfur trioxide, to form additional fluorosulfonic acid.

Another object of the invention is the coproduction of hydrogen fluoride and phosphorous pentafluoride, with the production of major quantities of the hydrogen fluoride from calcium fluoride in the presence of fluorosulfonic acid.

An additional object is to recover hydrogen fluoride from the reactant gas mixture rather than relatively low volatility sulfuric acid from the reaction residue.

Another object is to manufacture hydrogen fluoride incidental to phosphoric acid manufacture by the fluorosulfonic acidphosphoric acid process.

SUMMARY OF THE INVENTION

A process for producing hydrogen fluoride from fluoride bearing ores comprising contacting fluoride and phosphate bearing ores with fluorosulfonic acid to release hydrogen fluoride and volatile phosphorous compounds, separating said hydrogen fluoride and said volatile phosphorous compounds from the excess fluorosulfonic acid and residual matter, separating said hydrogen fluoride from said volatile phosphorous compounds and recovering same.

PREFERRED EMBODIMENTS OF THE INVENTION

Hydrogen fluoride may be produced concurrently with the production of volatile phosphorous compounds such as phosphorous pentafluoride, phosphorous oxyfluoride and fluorophosphoric acids by the addition of fluorospar ore (CaF$_2$) to a reactant mass of calcium phosphate or fluorapatite ore and an excess of fluorosulfonic acid. It has also been found that the present process can be used to produce hydrogen fluoride by reacting fluorospar ore, even in the presence of silica, with fluorosulfonic acid and that the fluorosulfonic acid is released by sulfuric acid.

U.S. Pat. No. 4,202,867 (U.S. Ser. No. 000,987, filed Jan. 4, 1979) teaches an improved method of treating phosphate ores, including fluorapatites, with excess fluorosulfonic acid and small amounts of water to cause 98.0% or more of the phosphorous to be released from the ore, primarily in the form of phosphorous pentafluoride and phosphorous oxyfluoride. These volatile compounds are easily hydrolyzed to hydrofluoric acid and orthophosphoric acid, or may be hydrolyzed to hydrogen fluoride and mono-fluorophosphoric acid, which can be pyrolyzed to meta-phosphoric acid and hydrogen fluoride. Silicon dioxide is not appreciably attacked by the fluorosulfonic acid so that a portion of the fluoride content of the ore may also be released as hydrogen fluoride.

The teaching in U.S. Pat. No. 4,202,867 (Ser. No. 000,987, filed Jan. 4, 1979) regarding reacting excess fluorosulfonic acid with certain phosphate-containing ores is incorporated herein by reference.

In a preferred embodiment of the present invention, fluorosulfonic acid, in excess of stoichiometric requirements is combined with fluorapatite and fluorospar ores to form a slurry. The slurry is heated, preferably up to the boiling point of the slurry mass, which will approach the boiling point of fluorosulfonic acid (165.5° C.). If the reactor equipment is properly engineered and constructed, the necessary heat requirements will be provided by the exothermic heat of reaction. A preferred temperature range is from 150° to about 300° C. The fluorosulfonic acid used in the process should be from 2 to about 8 times, by weight, that of the $Ca_3(PO_4)_2$ raw materials.

It has been found that at least traces of water are essential to catalyze the reactions. By increasing the amount of water present in the reaction, the production of phosphorous pentafluoride is favored in the overall process, along with the hydrogen fluoride.

It was further discovered that fluorosulfonic acid could be reacted with fluorospar to form hydrogen fluoride without appreciably reacting with silica. This was found by placing fluorosulfonic acid in a Teflon flask and heating the acid to boiling, followed by the addition of finely divided silica thereto. A gas sample was taken from the flask and analyzed. Only a trace amount of silicon tetrafluoride was found in the gas.

Finely divided calcium fluoride was then added to the flask and another gas sample was taken. Once more, only a trace amount of silicon tetrafluoride was present. However, it was found that a large quantity of hydrogen fluoride had been produced.

In another experiment, 75 parts of calcium phosphate, 7.3 parts of calcium fluoride and 7.5 parts of silica (all parts being by weight) were introduced into an excess of fluorosulfonic acid and the mixture then heated to boiling. The predominant vapors were hydrogen fluoride, phosphorous oxyfluoride and phosphorous pentafluoride. There was only a trace of silica tetrafluoride detected.

The following examples demonstrate the basic chemistry of the reaction of fluorosulfonic acid with calcium fluoride and the co-generation of hydrogen fluoride with volatile phosphorous compounds when a mixture of fluorapatite and calcium fluoride is reacted with fluorosulfonic acid.

Typical equations illustrating the combined ore reaction are:

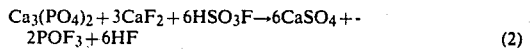

$$Ca_3(PO_4)_2 + 3CaF_2 + 6HSO_3F \rightarrow 6CaSO_4 + 2POF_3 + 6HF \quad (2)$$

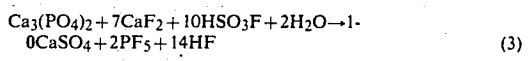

$$Ca_3(PO_4)_2 + 7CaF_2 + 10HSO_3F + 2H_2O \rightarrow 10CaSO_4 + 2PF_5 + 14HF \quad (3)$$

EXAMPLE 1

In this experiment, the first step was to mix 19.8 grams of calcium fluoride with 106.5 grams fluorosulfonic acid in a Telfon flask, the mixture was then heated to boiling while refluxing to retain the fluorosulfonic acid. The net overload was condensed and collected; 9.94 grams of hydrogen fluoride were produced as the net overhead product, which represents 97% recovery of the theoretical hydrogen fluoride that could have been produced. In the next step of the experiment, 28 grams of sulfuric acid were added to the residue in the flask and then boiled, with the overhead being condensed and collected. The residue in the flask was analyzed to be calcium sulfate, containing essentially no fluorine, and 97 grams of fluorosulfonic acid were collected as the overhead product. These two steps demonstrate that the following reactions occurred:

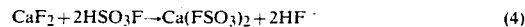

$$CaF_2 + 2HSO_3F \rightarrow Ca(FSO_3)_2 + 2HF \quad (4)$$

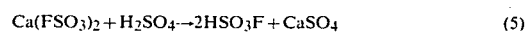

$$Ca(FSO_3)_2 + H_2SO_4 \rightarrow 2HSO_3F + CaSO_4 \quad (5)$$

As can be observed from the above two reactions, the net reactant requirement is sulfuric acid, with the fluorosulfonic acid being regenerated in accordance with equation (5) for recycle to equation (4).

Since sulfuric acid is produced as a result of the basic reactions between fluorosulfonic acid and calcium phosphate, that is:

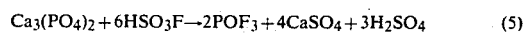

$$Ca_3(PO_4)_2 + 6HSO_3F \rightarrow 2POF_3 + 4CaSO_4 + 3H_2SO_4 \quad (5)$$

and

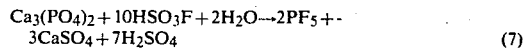

$$Ca_3(PO_4)_2 + 10HSO_3F + 2H_2O \rightarrow 2PF_5 + 3CaSO_4 + 7H_2SO_4 \quad (7)$$

by-product sulfuric acid will be present in the residual mass. If fluorspar, $CaF_2$, is added to the system, either before or after the basic reaction between calcium phosphate and fluorosulfonic acid, then the excess fluorosulfonic acid will be available to react with the calcium fluoride in accordance with equation (4) and the sulfuric acid produced in accordance with equations (6) and (7) will react with the calcium fluorosulfonate produced in accordance with equation (5). Thus, a co-product of hydrogen fluoride can be produced in addition to the volatile phosphorous compounds and fluorosulfonic acid is recovered, so that calcium sulfate is the residual matter.

EXAMPLE 2

To demonstrate the foregoing, an experiment was conducted wherein 20 grams of Florida pebble phosphate ore and 10 grams of calcium fluoride were added to 124 grams of fluorosulfonic acid, heated to boiling and refluxed to expel the volatile phosphorous compounds and hydrogen fluoride. The 10 grams of calcium fluoride used in the experiment is equivalent to 80% of the stoichiometric amount of $CaF_2$ that could be added when the amount of sulfuric acid available is that which would be produced when the volatile phosphorous compounds are formed as indicated in equations (6) and (7) in the ratio of 70% phosphorous oxyfluoride and 30% phosphorous pentafluoride. At the conclusion of the procedure, no phosphorous remained in the residue, indicating complete volatilization. The fluorosulfonic acid was then separated from the residue and no calcium fluoride remained.

As is to be recognized by those skilled in the art, other reaction masses containing waste or by-product sulfuric acid can be used for the manufacture of hydrogen fluoride, by the addition of fluorosulfonic acid and calcium fluoride. Or, fluorosulfonic acid and sulfuric acid can be used to treat fluorospar ores, even those containing silica, for the direct manufacture of hydrogen fluoride, rather than the conventional method of using sulfuric acid alone, since the presence of fluorosulfonic acid lowers the reaction temperature and minimizes silica attack.

What is claimed is:

1. A process for producing hydrogen fluoride from fluoride bearing ores comprising
    contacting a fluoride and a phosphate bearing raw material with fluorosulfonic acid to release hydrogen fluoride and volatile phosphorous compounds,
    separating said hydrogen fluoride and said volatile phosphorous compounds from the excess fluorosulfonic acid and residual matter,
    separating said hydrogen fluoride from said volatile phosphorous compounds and recovering same.

2. The process according to claim 1, wherein the volatile phosphorous compounds are phosphorous pentafluoride and phosphorous oxyfluoride.

3. The process according to claim 1, wherein the hydrogen fluoride produced is additional product over the hydrogen fluoride produced by hydrolyzing the volatile phosphorous compounds.

4. The process according to claim 1, wherein the flouride bearing ores are a mixture of fluorspar and fluorapatite.

5. A process for producing hydrogen fluoride from fluoride bearing ores comprising
    forming a slurry of a stoichiometric excess of fluorosulfonic acid and a calcium phosphate ore, in the presence of calcium fluoride,
    reacting the slurry components to produce volatile phosphorous compounds and hydrogen fluoride,
    separating the volatile phosphorous compounds and hydrogen fluoride from the reaction mass,
    separating the volatile phosphorous compounds from the hydrogen fluoride,
    recovering the hydrogen fluoride.

6. The process according to claim 5, wherein the quantity of calcium fluoride present in the slurry approximates the amount required to react with the sulfuric acid by-product formed in the reaction between said fluorosulfonic acid and the calcium phosphate.

7. The process according to claim 5, wherein sufficient hydrogen fluoride recovered is reacted with sulfur trioxide to provide fluorosulfonic acid for the process.

8. The process according to claim 7, wherein the hydrogen fluoride recycled is at least equal to the hydrogen fluoride required to produce the fluorosulfonic acid needed and the balance is recovered as product.

9. The process according to claim 5, wherein fluorosulfonic acid is volatilized from the residual matter and subsequently separated from other volatile compounds and recycled in the process.

10. The process according to claim 5, wherein the fluorosulfonic acid used is two to eight times by weight that of the calcium phosphate.

11. The process according to claim 5, wherein the slurry is heated to a temperature of from 150° to about 300° C.

12. The process according to claim 5, wherein hydrogen fluoride, phosphorous pentafluoride and phosphorous oxyfluoride are separated as final products.

13. The process according to claim 5, wherein the fluorosulfonic acid makeup requirement is provided by the reaction of sulfur trioxide with a portion of the hydrogen fluoride provided therein.

14. A process for producing hydrogen fluoride and phosphoric acid comprising
    forming a slurry of calcium phosphate material with sufficient fluorosulfonic acid to produce volatile phosphorous compounds,
    including in the slurry calcium fluoride, to produce hydrogen fluoride,
    separating the hydrogen fluoride and volatile phosphorous compounds from the fluorosulfonic acid and residual mass,
    hydrolyzing the volatile phosphorous compounds to produce phosphoric acid, and
    recovering the hydrogen fluoride from the calcium fluoride as an additional product to hydrogen fluoride produced on hydrolysis of the volatile phosphorous compounds to form phosphoric acid.

15. The process according to claim 14, wherein the volatile phosphorous compounds and hydrogen fluoride produced and the fluorosulfonic are first separated from the residual matter, followed by addition of calcium fluoride material to the acidic residual matter,
    forming hydrogen fluoride,
    which is recovered as additional product.

16. A process for producing hydrogen fluoride comprising
    reacting fluorosulfonic acid with calcium fluoride, in the presence of sulfuric acid, and
    recovering the hydrogen fluoride thus produced.

* * * * *